United States Patent [19]
von Sivers

[11] Patent Number: 4,503,926
[45] Date of Patent: Mar. 12, 1985

[54] DRIVE AGGREGATE

[75] Inventor: Rolf von Sivers, Rutesheim, Fed. Rep. of Germany

[73] Assignee: Dr. Ing. H. C. F. Porsche Aktiengesellschaft, Stuttgart, Fed. Rep. of Germany

[21] Appl. No.: 443,870

[22] Filed: Nov. 23, 1982

[30] Foreign Application Priority Data

Nov. 28, 1981 [DE] Fed. Rep. of Germany ....... 3147298

[51] Int. Cl.³ .............................................. B60K 5/02
[52] U.S. Cl. .................................... 180/75.2; 180/291
[58] Field of Search ...................... 180/70 P, 291, 292, 180/293, 299, 75.2

[56] References Cited

U.S. PATENT DOCUMENTS

| | | | |
|---|---|---|---|
| 2,373,356 | 4/1945 | Thoms et al. | 180/292 |
| 2,477,252 | 7/1949 | Hutchings | 180/70 P |
| 3,998,290 | 12/1976 | Sivers et al. | 180/292 |
| 4,273,207 | 6/1981 | Sivers et al. | 180/70 P |

FOREIGN PATENT DOCUMENTS

| | | | |
|---|---|---|---|
| 147491 | 7/1952 | Australia | 180/293 |
| 2152165 | 4/1973 | Fed. Rep. of Germany | |

OTHER PUBLICATIONS

*Automobiltechnische Zeitschrift*, vol. 79, No. 10, Oct. 1977, pp. 459–462, "Der Antriebsstrang des Porsche 928 (The Porsche 928 Power Train)" by W. Hanisch and K. H. Stemle.

Primary Examiner—Joseph F. Peters, Jr.
Assistant Examiner—Kenneth R. Rice
Attorney, Agent, or Firm—Craig & Burns

[57] ABSTRACT

A drive aggregate for a motor vehicle consisting of an internal combustion engine with a separating clutch and of a transmission unit; the internal combustion engine together with the separating clutch is arranged at the front end and the transmission unit at the rear end of the motor vehicle and both units are connected into an overall unit by interposition of a hollow connecting bearer which is constructed rectangularly shaped in cross section and which is provided at its walls with retaining devices arranged on the outside thereof. Attachment parts, such as, for example, a shifting lever support, an exhaust gas installation and lines are retained in these retaining devices. The walls of the connecting bearer are constructed in such a manner that will result in the bearer having a similar resistance moment in its main axes with approximately the same resonant frequency as the engine and transmission.

12 Claims, 3 Drawing Figures

DRIVE AGGREGATE

The present invention relates to a drive aggregate for a motor vehicle, consisting of an internal combustion engine with a separating clutch and of a transmission unit, whereby the internal combustion engine together with the separating clutch is arranged at the front end and the transmission unit at the rear end of the vehicle and the aggregates form an overall aggregate under interposition of a hollow connecting bearer.

Such drive aggregates are equipped with a connecting bearer made from a tubular member of round cross section (Publication ATZ 79 (1977) 10, pages 459 to 462), which has an identical moment of resistance in its main axes. For fastening various attachment parts, such as, for example, a shifting lever support for a shifting lever, an exhaust gas system, lines or the like at the connecting bearer, costly fastening arrangements are required which are to be connected with the bearer. With known frame bearers having a rectangular cross section (German Offenlegungsschrift No. 21 52 165), different resonant frequencies would result from the different resistance moments in the main axes in case of use as connecting bearer for a drive aggregate of the aforementioned type. A large number of vibration peaks result from these different resonant frequencies over the possible rotational speed range of the internal combustion engine which produces an unfavorable noise behavior.

It is the aim of the present invention to provide a connecting bearer for a drive aggregate of the aforementioned type, by means of which a favorable vibration behavior is achieved and a mounting and fastening of attachment elements is facilitated.

The underlying problems are solved according to the present invention in that the connecting bearer is provided at its walls with retaining devices arranged on the outside thereof and the walls are constructed in such a manner that a connecting bearer is formed having the same resistance moment in its main axes with approximately the same resonant frequencies of the overall aggregate.

The advantages principally achieved with the present invention reside in that, notwithstanding the integrated arrangement of retaining devices in the walls of the connecting bearer rectangularly shaped in cross section, an identical resonant frequency of the overall aggregate is achieved in each of the horizontal, vertical and diagonal axes by a corresponding wall construction. Furthermore, a simple fastening at the connecting bearer may be realized by the slip-in grooves of dove-tail-shaped configuration as well as by clamping grooves of round cross section. Costly mounting and retaining devices which are fixed at the bearer can be dispensed with. Additionally, the lines clamped into the grooves along the corners of the bearer act in a reinforcing and vibration-damping manner.

These and other objects, features and advantages of the present invention will become more apparent from the following description when taken in connection with the accompanying drawing which shows, for purposes of illustration only, one embodiment in accordance with the present invention, and wherein.

Figure 1:
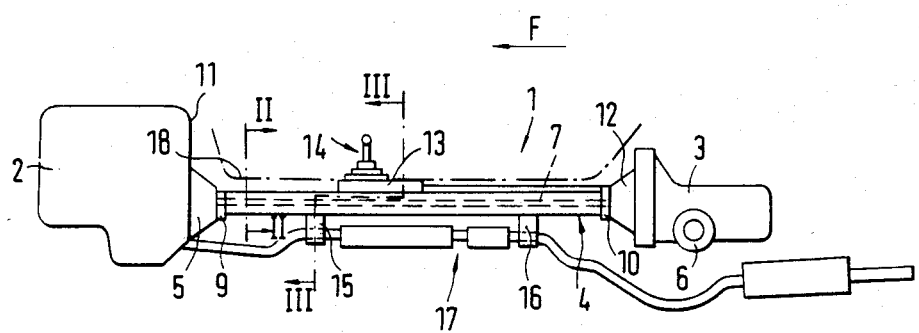
FIG. 1 is a side elevational view of an internal combustion engine connected with a transmission unit by way of a connecting bearer for the purpose of forming a rigidly interconnected overall aggregate in accordance with the present invention.
Figure 2:
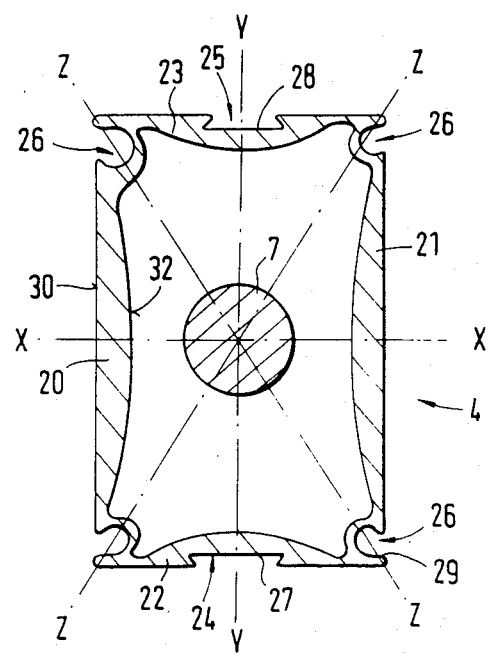
FIG. 2 is a cross-sectional view, on an enlarged scale, through the connecting bearer according to the present invention, taken along line II—II of FIG. 1.
Figure 3:
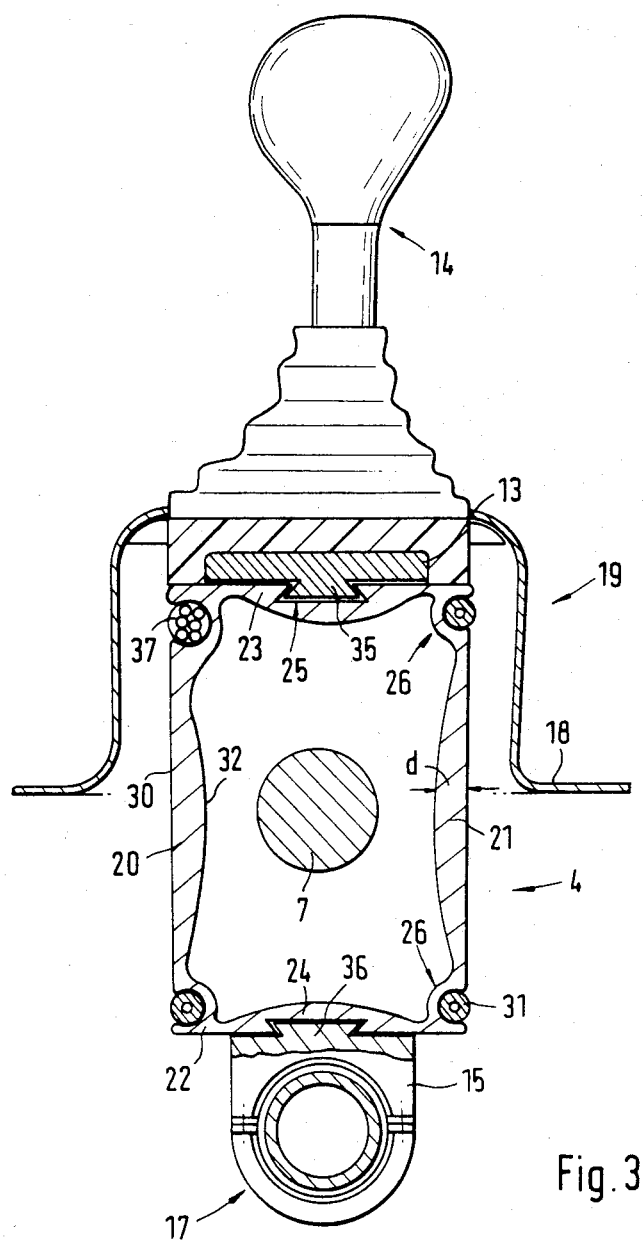
FIG. 3 is a cross-sectional view, on an enlarged scale, through the connecting bearer according to the present invention, taken along line III—III of FIG. 1.

Referring now to the drawing wherein like reference numerals are used throughout the various views to designate like parts, an overall aggregate generally designated by reference numeral 1 of a motor vehicle is illustrated in FIG. 1, which in relation to the driving direction F, includes an internal combustion engine 2 disposed essentially in front and a transmission 3 disposed essentially in the rear of the vehicle. The internal combustion engine 2 is rigidly connected with the transmission 3 into an overall aggregate by way of an interposed connecting bearer 4, in which is retained a drive shaft 7. A separating clutch 5 is provided at the internal combustion engine 2 and an axle drive 6 is provided at the transmission 3. The connecting bearer 4 is provided at its ends with flanges 9 and 10 which are connected with the engine housing 11, respectively, with the transmission housing 12. A shifting lever support 13 for a shifting lever 14 and mounting devices 15 and 16 for an exhaust gas system 17 are secured at the connecting bearer 4. The connecting bearer 4 is arranged in a tunnel 19 formed by the floor plate 18 of the body structure of the motor vehicle and is separated from its interior space. In an advantageous construction, the connecting bearer 4 can be manufactured of aluminum by the extrusion method. However, a construction, for example, of magnesium, laminated fiber material or also as sheet-metal sandwich construction is also possible.

The connecting bearer 4 is constructed rectangularly shaped in cross section and is provided in its walls 20, 21, 22 and 23 with retaining arrangements 24, 25 and 26. The walls 20 to 23 form an identical resistance moment of the bearer in each of the main axes x, y and z, taking into consideration the integrated mounting and retaining devices 24, 25 and 26. For purposes of achieving these identical resistance moments, the walls are correspondingly dimensioned. The location of the resonant frequencies will result in dependence on the resistance moments of the connecting bearer 4 in conjunction with the rigidities and mass distributions of the engine and transmission so that with a respectively similar resistance moment in each of the main axes, an approximately identical resonant frequency results about these main axes. For purposes of achieving the same resistance moment of the bearer 4 in all main axes x, y and z, a dimensioning of the walls 20 to 23 is required in such a manner that the thicknesses decrease uniformly in the direction toward the corners. The inner surfaces 32 of the walls 20 to 23 are arched or curved between the corners of wall, whereby the greatest thicknesses d of the walls are disposed in the two main axes x and y.

The retaining devices 24 and 25 in the horizontal walls 22 and 23 are constructed, for example, as dove-tail-shaped slip-in grooves 27 and 28. However, also another shape is possible. In the illustrated embodiment, they receive the shifting lever support 13 of the shifting lever 14 as well as a pipe of the exhaust gas installation 17 at the bottom side of the connecting bearer 4 by way of the corresponding mounting devices 15 and 16. The shifting lever support 13 as well as the mounting devices 15 and 16 have, for that purpose, at their respective bottom side a profile 35 and 36 which is inserted into the corresponding dove-tail guidance of the grooves 27 and 28. Attachment can take place by way of a corresponding fastening means such as, for example, clamping bolts, wedges or the like.

The mounting device 26 is arranged in each case in the corner area of the bearer 4 and is formed by a clamping groove 29. Medium-carrying lines 31 such as, for example, brake lines or also electrical lines 37 are retained therein. The mounting devices 24, 25 and 26 extend preferably over the entire length of the connecting bearer 4; however, they may also be provided only in the required partial areas thereof. Preferably, the retaining devices are inset into the walls so that they close off flush with the outer surface 30 of the bearer 4.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A drive aggregate for a motor vehicle, comprising an internal combustion engine having a separating clutch and a transmission unit, the internal combustion engine together with the separating clutch being arranged in the front area of the vehicle and the transmission unit in the rear thereof, and the internal combustion engine together with the separating clutch as well as the transmission unit forming an overall aggregate under interposition of a hollow connecting bearer means, the connecting bearer means is provided along its walls with retaining means arranged on the outside thereof and the walls are constructed in such a manner that a connecting bearer means is formed having at least essentially the same resistance moment in its main axes with at least approximately the same resonant frequencies of the overall aggregate, the thickness of the walls of the connecting bearer means decreases essentially uniformly in the direction toward a corner, and
   at least one of inner and outer surfaces of the walls of the connecting bearer means are arcuately shaped between corners thereof, whereby the greatest thickness of each wall lies essentially in the main axes.

2. A drive aggregate for a motor vehicle, comprising an internal combustion engine having a separating clutch and a transmission unit, the internal combustion engine together with the separating clutch being arranged in the front area of the vehicle and the transmission unit in the rear area thereof, and the internal combustion engine together with the separating clutch as well as the transmission unit forming an overall aggregate under interposition of a hollow connecting bearer means, the connecting bearer means is provided along its walls with retaining means arranged on the outside thereof and the walls are constructed in such a manner that a connecting bearer means is formed having at least essentially the same resistance moment in its main axes with at least approximately the same resonant frequencies of the overall aggregate, wherein
   the connecting bearer means is constructed rectangularly shaped in cross section and the retaining means are inset in the walls of the bearer means so as to terminate flush with the outer surface thereof.

3. A drive aggregate for a motor vehicle, comprising an internal combustion engine having a separating clutch and a transmission unit, the internal combustion engine together with the separating clutch being arranged in the front area of the vehicle and the transmission unit in the rear area thereof, and the internal combustion engine together with the separating clutch as well as the transmission unit forming an overall aggregate under interposition of a hollow connecting bearer means, the connecting bearer means is provided along its walls with retaining means arranged on the outside thereof and the walls are constructed in such a manner that a connecting bearer means is formed having at least essentially the same resistance moment in its main axes with at least approximately the same resonant frequencies of the overall aggregate, wherein
   the retaining means include insert groove means and further retaining means include clamping groove means.

4. A drive aggregate according to claim 3, wherein the connecting bearer means comprises at least horizontal walls and wherein insert groove means of dove-tail-shape in cross section are provided in the essentially horizontal walls of the connecting bearer means for receiving a shifting lever support and mounting means for an exhaust gas installation, the insert groove means being in operative engagement with a corresponding profile at the shifting lever support and with profiles at the mounting means.

5. A drive aggregate according to claim 4, further comprising a clamping groove means provided in a corner area of the connecting bearer means for secure accommodation of lines.

6. A drive aggregate according to claim 5, wherein the thickness of the walls of the connecting bearer means decreases essentially uniformly in the direction toward a corner.

7. A drive aggregate according to claim 6, wherein at least one of inner and outer surfaces of the walls of the connecting bearer means are arcuately shaped between corners thereof, whereby the greatest thickness of each wall lies essentially in the main axes.

8. A drive aggregate according to claim 7, characterized in that the insert groove means as well as the clamping groove means are arranged over a partial area of the length of the connecting bearer means.

9. A drive aggregate according to claim 7, characterized in that the connecting bearer means consists of aluminum.

10. A drive aggregate according to claim 7, characterized in that the connecting bearer means is constructed rectangularly shaped in cross section and the retaining means are inset in the walls of the bearer means so as to terminate flush with the outer surface thereof.

11. A drive aggregate according to claim 3, characterized in that the insert groove means as well as the clamping groove means are arranged over a partial area of the length of the connecting bearer means.

12. A drive aggregate for a motor vehicle, comprising an internal combustion engine having a separating clutch and a transmission unit, the internal combustion engine together with the separating clutch being arranged in the front area of the vehicle and the transmission unit in the rear area thereof, and the internal combustion engine together with the separating clutch as well as the transmission unit forming an overall aggregate under interposition of a hollow connecting bearer means, the connecting bearer means is provided along its walls with retaining means arranged on the outside thereof and the walls are constructed in such a manner that a connecting bearer means is formed having at least essentially the same resistance moment in its main axes with at least approximately the same resonant frequencies of the overall aggregate, wherein a clamping groove means is provided in a corner area of the connecting bearer means for secure accommodation of lines.

* * * * *